US012693753B2

(12) United States Patent
Chou et al.

(10) Patent No.: US 12,693,753 B2
(45) Date of Patent: Jul. 28, 2026

(54) STRETCHABLE DISPLAY DEVICE

(71) Applicant: AUO Corporation, Hsinchu City (TW)

(72) Inventors: Sheng-Hsun Chou, Hsinchu City
(TW); Kent-Yi Lee, Hsinchu City
(TW); Ying-Shin Huang, Hsinchu City
(TW); Chia-Kai Chen, Hsinchu City
(TW)

(73) Assignee: AUO Corporation, Hsinchu City (TW)

( * ) Notice: Subject to any disclaimer, the term of this
patent is extended or adjusted under 35
U.S.C. 154(b) by 0 days.

(21) Appl. No.: 19/234,253

(22) Filed: Jun. 10, 2025

(65) Prior Publication Data

US 2026/0195001 A1 Jul. 9, 2026

(30) Foreign Application Priority Data

Jan. 3, 2025 (TW) ................................. 114100255

(51) Int. Cl.
*G06F 3/041* (2006.01)
*G09G 3/00* (2006.01)
(52) U.S. Cl.
CPC ........... *G06F 3/0412* (2013.01); *G09G 3/035*
(2020.08); *G06F 2203/04102* (2013.01)
(58) Field of Classification Search
CPC .......... G09G 3/035; G09G 2203/04102; G06F
3/0412; G09F 9/301
See application file for complete search history.

(56) References Cited

U.S. PATENT DOCUMENTS

| | | | | |
|---|---|---|---|---|
| 10,684,716 B2 * | 6/2020 | Zhai | ...................... | G06F 3/0443 |
| 11,522,039 B2 * | 12/2022 | Zhai | ................... | G06F 3/04164 |
| 11,569,309 B2 * | 1/2023 | Wu | ......................... | G06F 3/041 |
| 11,714,504 B2 * | 8/2023 | Kim | ................... | G06F 3/04184 |
| | | | | 345/174 |
| 12,011,908 B2 * | 6/2024 | Wang | ....................... | B32B 3/30 |
| 12,056,300 B2 * | 8/2024 | Hu | ........................ | G06F 3/0412 |
| 12,360,632 B2 * | 7/2025 | Kim | ....................... | G06F 3/0443 |
| 2019/0258297 A1 * | 8/2019 | Choi | ..................... | G06F 1/1652 |
| 2022/0206619 A1 * | 6/2022 | Kim | ...................... | G06F 3/0445 |
| 2022/0367822 A1 * | 11/2022 | Boardman | ............ | H10K 59/40 |
| 2023/0027621 A1 * | 1/2023 | Ke | ......................... | H05K 1/181 |
| 2024/0053841 A1 * | 2/2024 | Hu | ........................ | G06F 1/1652 |
| 2024/0220052 A1 * | 7/2024 | Kim | ....................... | G09F 9/301 |
| 2025/0306712 A1 * | 10/2025 | Kim | ..................... | H03M 1/001 |

FOREIGN PATENT DOCUMENTS

| | | |
|---|---|---|
| CN | 108564885 | 9/2018 |
| CN | 111968522 | 11/2020 |
| CN | 114695416 | 7/2022 |

* cited by examiner

*Primary Examiner* — Patrick F Marinelli
(74) *Attorney, Agent, or Firm* — JCIPRNET

(57) ABSTRACT

A stretchable display device including a stretchable display
panel and a stretchable touch panel is provided. The stretch-
able display panel has a first Young's modulus. The stretch-
able touch panel is disposed on the stretchable display panel
and has a second Young's modulus. A ratio of the second
Young's modulus and the first Young's modulus is within a
range of 0.5 to 1.5.

12 Claims, 7 Drawing Sheets

1

STRETCHABLE DISPLAY DEVICE

CROSS-REFERENCE TO RELATED APPLICATION

This application claims the priority benefit of Taiwan application serial no. 114100255, filed on Jan. 3, 2025. The entirety of the above-mentioned patent application is hereby incorporated by reference herein and made a part of this specification.

BACKGROUND

Technical Field

The disclosure relates to a stretchable display device.

Description of Related Art

In conventional stretchable display devices, the Young's modulus of the touch panel does not match the Young's modulus of the display panel, so structural damage is likely to occur inside the touch panel or inside the display panel.

SUMMARY

A stretchable display device with high tensile strength is provided in the disclosure.

According to an embodiment of the disclosure, a stretchable display device is provided, including a stretchable display panel and a stretchable touch panel. The stretchable display panel has a first Young's modulus. The stretchable touch panel is disposed on the stretchable display panel and has a second Young's modulus. A ratio of the second Young's modulus to the first Young's modulus is within a range of 0.5 to 1.5.

According to another embodiment of the disclosure, a stretchable display device is provided, including a stretchable display panel and a stretchable touch panel. The stretchable display panel has a first Young's modulus and includes multiple display units arranged in an array. Each of the display units has a first width in a first direction and a second width in a second direction. The stretchable touch panel is disposed on the stretchable display panel and has a second Young's modulus. A ratio of the second Young's modulus to the first Young's modulus is within a range of 0.5 to 1.5. The stretchable touch panel includes multiple touch micro-units arranged in an array. Each of the touch micro-units has a third width in the first direction and a fourth width in the second direction, and includes a patterned support layer, multiple first conductive lines, multiple second conductive lines, and an insulating layer. The first conductive lines are disposed on the patterned support layer. The second conductive lines are disposed on the first conductive lines. The insulating layer is disposed between the first conductive lines and the second conductive lines. The third width is not equal to the fourth width.

Based on the above, in the stretchable display device provided by an embodiment of the disclosure, the ratio of the Young's modulus of the stretchable touch panel to the Young's modulus of the stretchable display panel is within the range of 0.5 to 1.5, which may prevent structural damage inside the stretchable touch panel and the stretchable display panel, resulting in high tensile strength of the stretchable display device.

In order to make the above-mentioned features and advantages of the disclosure comprehensible, embodiments accompanied with drawings are described in detail below.

DETAILED DESCRIPTION OF DISCLOSED EMBODIMENTS

Figure 1A:
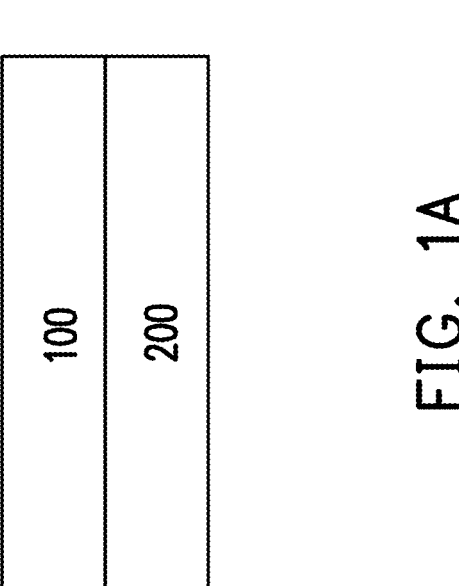
FIG. 1A is a cross-sectional schematic diagram of a stretchable display device according to an embodiment of the disclosure.
Figure 1A:
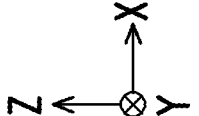

Referring to FIG. 1A, FIG. 1A is a cross-sectional schematic diagram of a stretchable display device according to an embodiment of the disclosure.

As shown in FIG. 1A, the stretchable display device 1 includes a stretchable display panel 200 and a stretchable touch panel 100. The stretchable touch panel 100 is disposed on the stretchable display panel 200. However, the disclosure is not limited thereto.

Figure 1B:
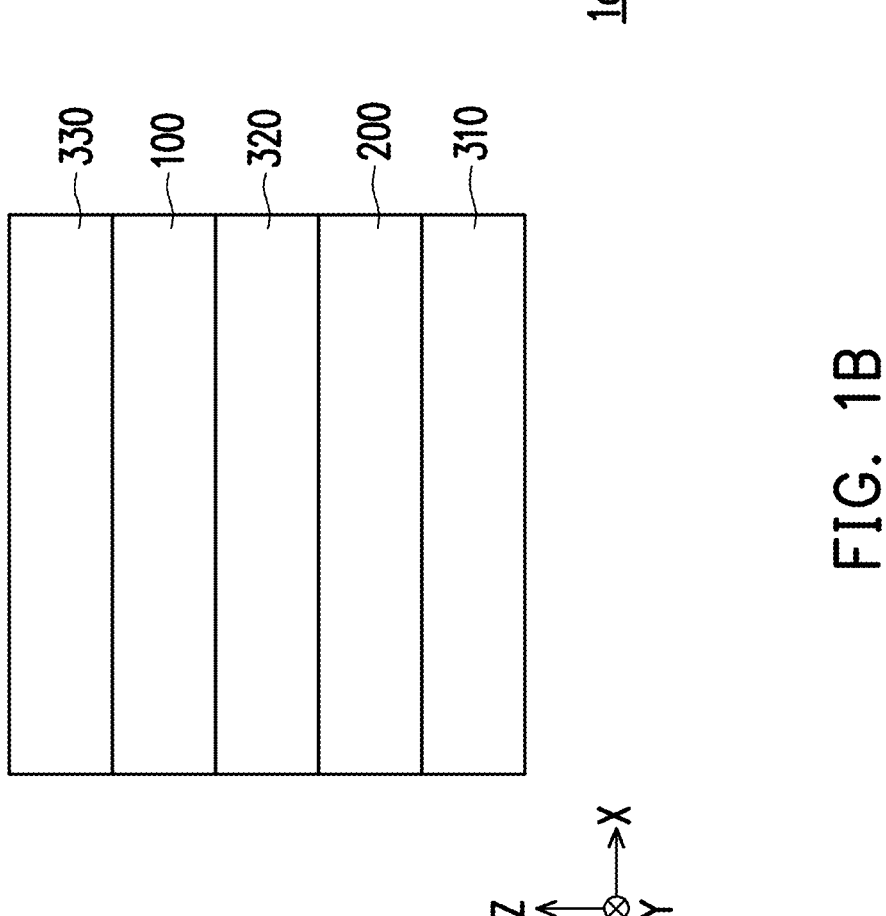
FIG. 1B is a cross-sectional schematic diagram of a stretchable display device according to another embodiment of the disclosure.

Referring to FIG. 1B, FIG. 1B is a cross-sectional schematic diagram of a stretchable display device according to another embodiment of the disclosure. As shown in FIG. 1B, a stretchable display device 1a includes a stretchable display panel 200 and a stretchable touch panel 100. In addition, the stretchable display device 1a may further include a stretchable film layer 310, a stretchable film layer 320 and a protection layer 330. The stretchable film layer 310 is disposed below the stretchable display panel 200. The stretchable film layer 320 is disposed below the stretchable touch panel 100. The protection layer 330 is disposed above the stretchable touch panel 100. The stretchable film layer 310 may include, for example, thermoplastic polyurethane, silicone or other suitable materials. The stretchable film layer 320 may include, for example, thermoplastic polyurethane, silicone or other suitable materials. The protection layer 330 may include, for example, thermoplastic polyurethane, silicone or other suitable materials.

Figure 2A:
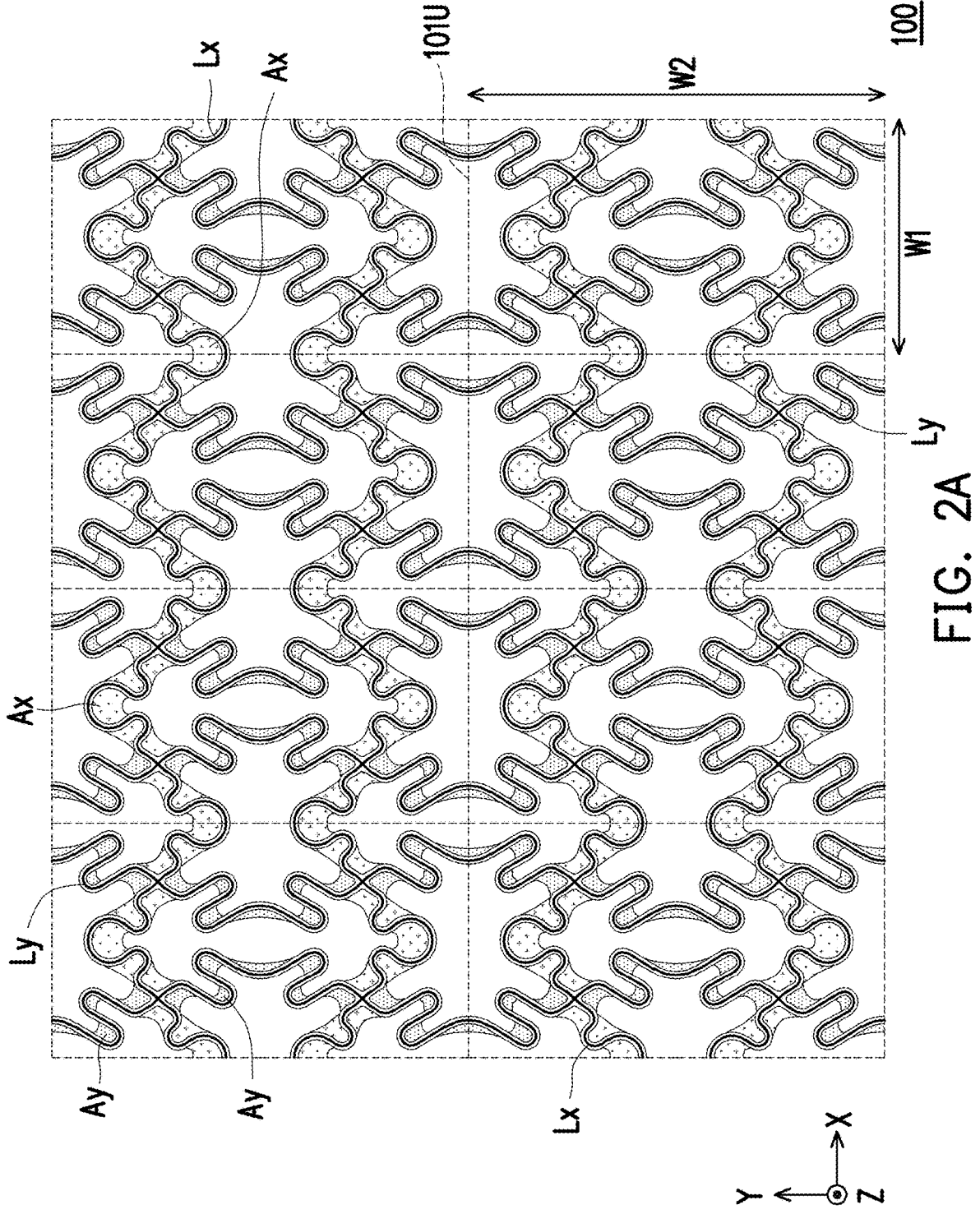
FIG. 2A is a planar schematic diagram of the stretchable touch panel in FIG. 1A and FIG. 1B.
Figure 2B:
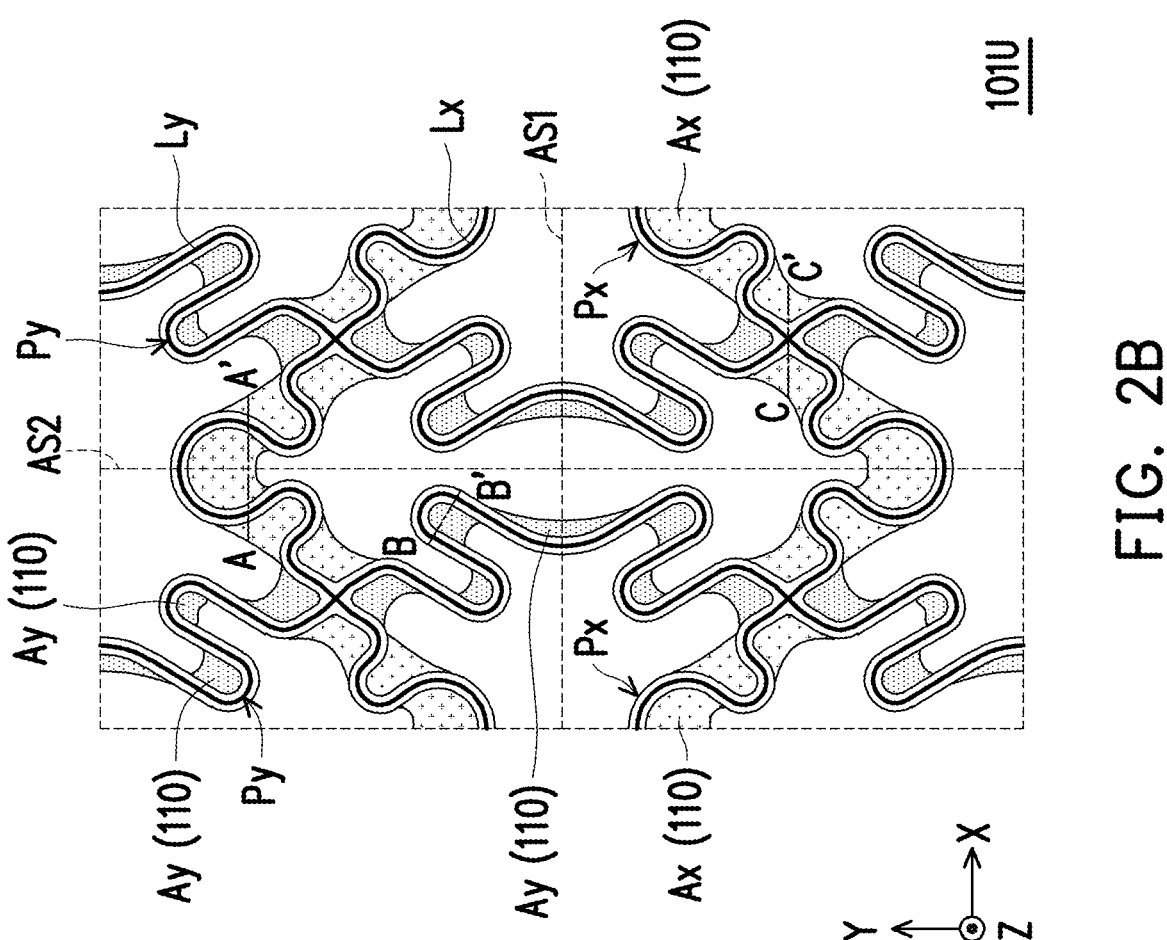
FIG. 2B is a planar schematic diagram of the touch micro-unit in FIG. 2A.
Figures 2C, 2D:
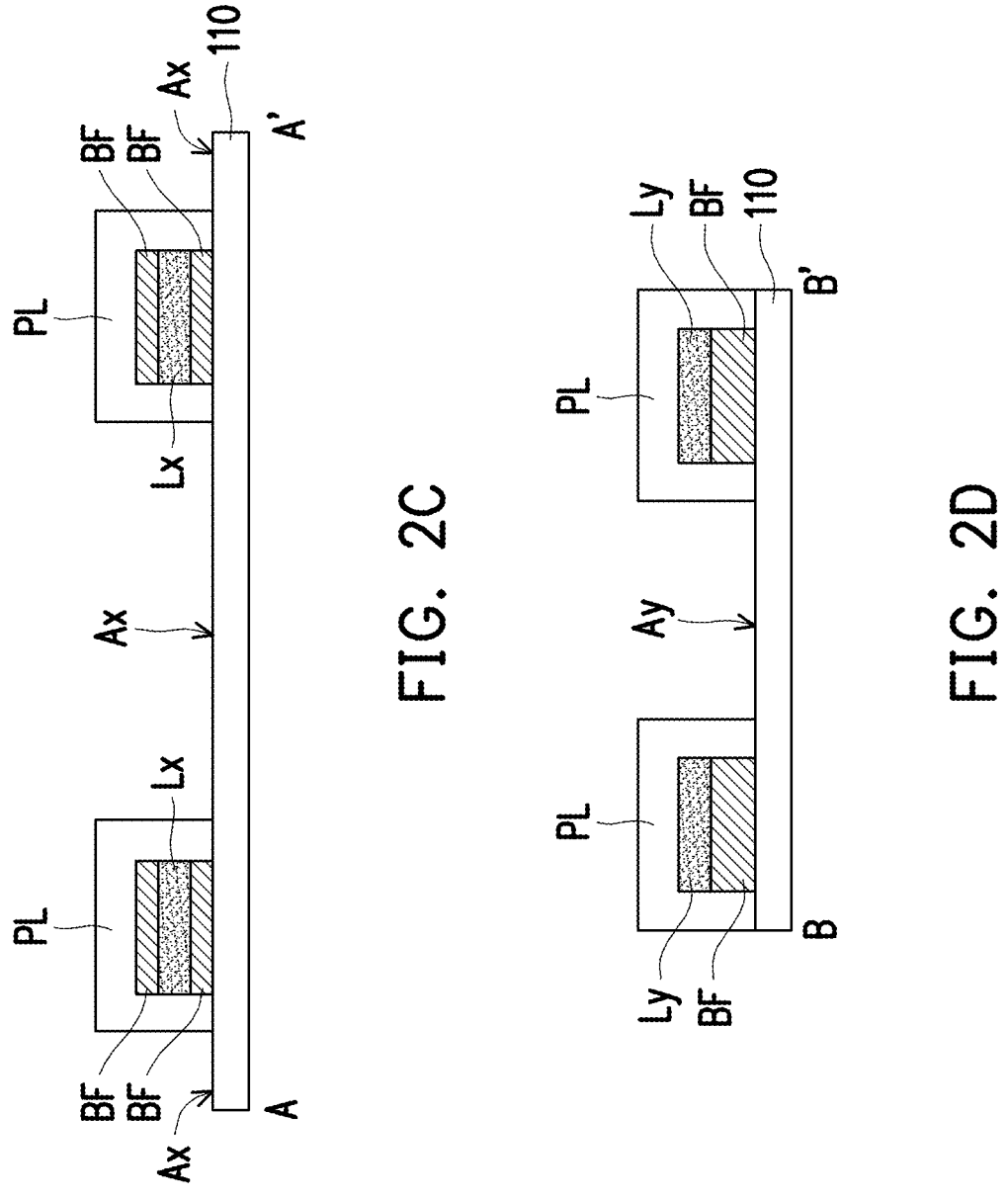
FIG. 2C is a cross-sectional schematic diagram along a line segment AA' in FIG. 2B.
FIG. 2D is a cross-sectional schematic diagram along a line segment BB' in FIG. 2B.
Figure 2E:
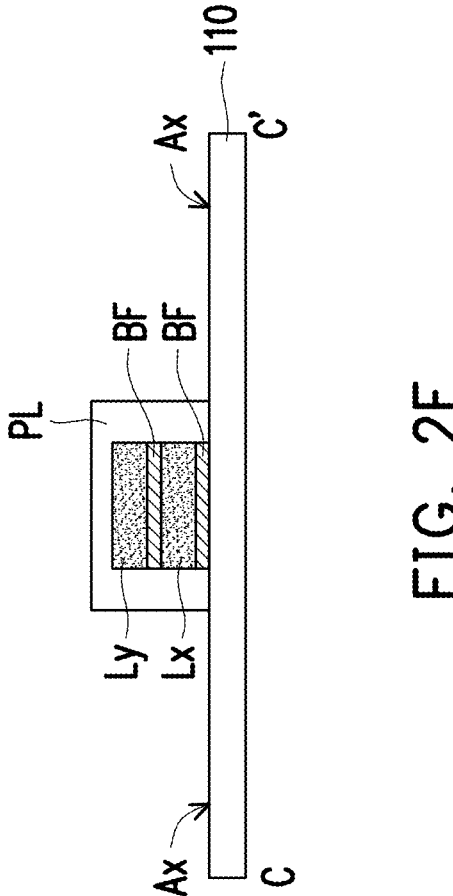
FIG. 2E is a cross-sectional schematic diagram along a line segment CC' in FIG. 2B.

Referring to FIG. 2A to FIG. 2E, FIG. 2A is a planar schematic diagram of the stretchable touch panel in FIG. 1A and FIG. 1B, FIG. 2B is a planar schematic diagram of the touch micro-unit in FIG. 2A, FIG. 2C is a cross-sectional schematic diagram along a line segment AA' in FIG. 2B, FIG. 2D is a cross-sectional schematic diagram along a line segment BB' in FIG. 2B, and FIG. 2E is a cross-sectional schematic diagram along a line segment CC' in FIG. 2B.

Referring to FIG. 2A, the stretchable touch panel 100 includes multiple conductive lines Lx and multiple conductive lines Ly. Furthermore, the stretchable touch panel 100 may be considered to be composed of multiple touch micro-units 101U arranged in an array, in which the touch micro-units 101U have the same structure.

As shown in FIG. 2B to FIG. 2E, each conductive line Lx and each conductive line Ly in each touch micro-unit 101U is a bending line, each conductive line Lx has multiple bending points (multiple first bending points) Px, and each conductive line Ly has multiple bending points (multiple second bending points) Py. Each conductive line Lx and each conductive line Ly has multiple U-shaped structures or multiple V-shaped structures corresponding to the bending points Px and Py. In this embodiment, the number of bending points Py on a single conductive line Ly is greater than the number of bending points Px on a single conductive line Lx, but not limited thereto. The conductive lines Lx and Ly are covered by an organic layer PL to be fixed.

In this embodiment, a touch micro-unit 101U has two conductive lines Lx and two conductive lines Ly. The two conductive lines Lx are symmetrically disposed with respect to a first virtual axis AS1 of the touch micro-unit 101U, the two conductive lines Ly are symmetrically disposed with respect to a second virtual axis AS2 of the touch micro-unit 101U, and the first virtual axis AS1 is perpendicular to the second virtual axis AS2. Accordingly, each touch micro-unit 101U may be stretched in any direction by means of the bending structure of the conductive lines Lx and Ly.

In FIG. 2B, the first virtual axis AS1 is perpendicular to the second virtual axis AS2, but the disclosure is not limited thereto. In some embodiments, the first virtual axis AS1 is neither parallel to nor perpendicular to the second virtual axis AS2, and an acute angle is defined between the first virtual axis AS1 and the second virtual axis AS2.

The touch micro-unit 101U of the embodiment of the disclosure is not limited to the two conductive lines Lx being symmetrically disposed with respect to the first virtual axis AS1 and the two conductive lines Ly being symmetrically disposed with respect to the second virtual axis AS2. In some embodiments, the two conductive lines Lx of a touch micro-unit 101U may be symmetrically disposed with respect to the first virtual axis AS1 first and then displaced laterally with respect to the second virtual axis AS2. The two conductive lines Ly may also be selectively symmetrically disposed with respect to the second virtual axis AS2 and then displaced vertically with respect to the first virtual axis AS1.

The touch micro-unit 101U of the embodiment of the disclosure is not limited to two conductive lines Lx and two conductive lines Ly. In some embodiments, each touch micro-unit 101U may have 2N conductive lines Lx symmetrically disposed with respect to the first virtual axis AS1 and 2M conductive lines Ly symmetrically disposed with respect to the second virtual axis AS2, in which N and M may be any positive integers.

The touch micro-unit 101U has a first width W1 in a direction parallel to the first virtual axis AS1 (X direction), and has a second width W2 in a direction parallel to the second virtual axis AS2 (Y direction), in which the first width W1 is less than the second width W2. However, the disclosure is not limited thereto, and in some embodiments, the first width W1 may be equal to the second width W2.

In this embodiment, the length of a single conductive line Ly is greater than the length of a single conductive line Lx, but not limited thereto. The ratio of the length of each conductive line Lx to the first width W1 is within the range of 1.5 to 3.0, and the ratio of the length of each conductive line Ly to the second width W2 is within the range of 1.5 to 3.0. Accordingly, the conductive lines Lx and Ly may have sufficient bending points Px and Py, so that each touch micro-unit 101U may be stretched in any direction, and the conductive lines Lx and Ly will not be broken during the stretching process.

It should also be noted that, as shown in FIG. 2B to FIG. 2E, each touch micro-unit 101U may further include a patterned support layer 110. The conductive lines Lx are disposed on the patterned support layer 110, the conductive lines Ly are disposed on the conductive lines Lx, and an insulating layer BF is disposed between the conductive lines Lx and the conductive lines Ly. In some embodiments, an insulating layer BF is further disposed between the conductive lines Lx and the patterned support layer 110, but the disclosure is not limited thereto. In some embodiments, the insulating layer BF may not be disposed between the conductive lines Lx and the patterned support layer 110. The patterned support layer 110 includes a first portion overlapping with the orthographic projection of the conductive lines Lx and Ly, and a second portion and a third portion to be described later. In some embodiments, the patterned support layer 110 may include polyimide (PI), but not limited thereto.

As shown in FIG. 2B, the patterned support layer 110 further includes a second portion having a U-shaped structure or a V-shaped structure corresponding to the two conductive lines Lx, and a third portion having a U-shaped structure or a V-shaped structure corresponding to the two conductive lines Ly. In other words, the second portion of the patterned support layer 110 corresponds to the bending points Px of the conductive lines Lx, and the third portion of the patterned support layer 110 corresponds to the bending points Py of the conductive lines Ly.

Furthermore, the second portion of the patterned support layer 110 has multiple first upper surfaces Ax, and the third portion of the patterned support layer 110 has multiple second upper surfaces Ay. In other words, the first upper surfaces Ax of the patterned support layer 110 correspond to the bending points Px of the conductive lines Lx, and the second upper surfaces Ay of the patterned support layer 110 correspond to the bending points Py of the conductive lines Ly, as shown in FIG. 2B. The vertical projections of the U-shaped structures or the V-shaped structures of the two conductive lines Lx on the patterned support layer 110 surround the first upper surfaces Ax, and the vertical projections of the U-shaped structures or the V-shaped structures of the two conductive lines Ly on the patterned support layer 110 surround the second upper surfaces Ay. It should be noted that, in a single touch micro-unit 101U, the total area of the first upper surfaces Ax may be different from the total area of the second upper surfaces Ay. Accordingly, the Young's modulus of each touch micro-unit 101U in a direction parallel to the first virtual axis AS1 may be adjusted, and the Young's modulus of each touch micro-unit 101U in a direction parallel to the second virtual axis AS2 may be adjusted. In other words, the Young's modulus of the stretchable touch panel 100 in a direction parallel to the first virtual axis AS1 may be adjusted, and the Young's modulus of the stretchable touch panel 100 in a direction parallel to the second virtual axis AS2 may be adjusted.

In the single touch micro-unit 101U shown in FIG. 2B, the total area of the first upper surfaces Ax of the second portion of the patterned support layer 110 is greater than the total area of the second upper surfaces Ay of the third portion of the patterned support layer 110. Accordingly, the Young's modulus of the stretchable touch panel 100 in the direction parallel to the first virtual axis AS1 may be substantially equal to the Young's modulus of the stretchable touch panel 100 in the direction parallel to the second virtual axis AS2.

Therefore, structural damage to the stretchable touch panel 100 in the direction of lower Young's modulus during the stretching process may be avoided.

In one embodiment, the second width W2 of a single touch micro-unit 101U is greater than the first width W1, and a ratio of the total area of the first upper surfaces Ax of the second portion of the patterned support layer 110 to the total area of the second upper surfaces Ay of the third portion of the patterned support layer 110 is within the range of 1 to $2*(W2/W1)^{1/2}$. Accordingly, the Young's modulus of the stretchable touch panel 100 in the direction parallel to the first virtual axis AS1 (X direction) may be substantially equal to the Young's modulus in the direction parallel to the second virtual axis AS2 (Y direction). Therefore, structural damage to the stretchable touch panel 100 in the direction of lower Young's modulus during the stretching process may be avoided.

In general, the Young's modulus of the stretchable touch panel 100 may be adjusted by controlling the total area of the first upper surfaces Ax of the second portion and the total area of the second upper surfaces Ay of the third portion of the patterned support layer 110 in the stretchable touch panel 100.

In some embodiments, the stretchable display panel 200 has a first Young's modulus, and the stretchable touch panel 100 has a second Young's modulus. A ratio of the second Young's modulus to the first Young's modulus is within a range of 0.5 to 1.5. Accordingly, it is possible to avoid a situation in which, during the stretching process of the stretchable display device 1, structural damage occurs inside the stretchable touch panel 100 or inside the stretchable display panel 200 due to the Young's modulus of the stretchable touch panel 100 not matching the Young's modulus of the stretchable display panel 200.

In some embodiments, the ratio of the Young's modulus of the stretchable film layer 310 and the stretchable film layer 320 shown in FIG. 1B to the Young's modulus of the stretchable display panel 200 may be less than 0.5, thereby further improving the tensile strength of the stretchable display device 1.

In one embodiment, the stretchable display panel 200 has a Young's modulus of 40 MPa, the stretchable touch panel 100 has a Young's modulus of 38 MPa in a direction parallel to the first virtual axis AS1, and has a Young's modulus of 38 MPa in a direction parallel to the second virtual axis AS2. The first width W1 of the touch micro-unit 101U is 254 μm, and the second width W2 is 440 μm. The length of a single conductive line Lx is 560 μm, and the length of a single conductive line Ly is 957 μm. In a single touch micro-unit 101U, the total area of the first upper surfaces Ax of the second portion of the patterned support layer 110 is 9264 $\mu m^2$, and the total area of the second upper surfaces Ay of the third portion of the patterned support layer 110 is 5328 $\mu m^2$. In this embodiment, the stretchable display device 1 may be stretched by more than 5 mm along the stacking direction (Z direction) of the stretchable display panel 200 and the stretchable touch panel 100.

In contrast, in a comparative example, the stretchable display panel 200 has a Young's modulus of 40 MPa, the stretchable touch panel 100 has a Young's modulus of 1 MPa in a direction parallel to the first virtual axis AS1, and has a Young's modulus of 1 MPa in a direction parallel to the second virtual axis AS2. The first width W1 of the touch micro-unit 101U is 254 μm, and the second width W2 is 440 μm. The length of a single conductive line Lx is 560 μm, and the length of a single conductive line Ly is 957 μm. In a single touch micro-unit 101U, the total area of the first upper surfaces Ax of the second portion of the patterned support layer 110 is 0 $\mu m^2$, and the total area of the second upper surfaces Ay of the third portion of the patterned support layer 110 is 0 $\mu m^2$ (in other words, the patterned support layer 110 of this comparative example does not have a second portion and a third portion). In this comparative example, the stretchable display device is stretched by less than 0.7 mm along the stacking direction (Z direction) of the stretchable display panel 200 and the stretchable touch panel 100.

Figure 2F:
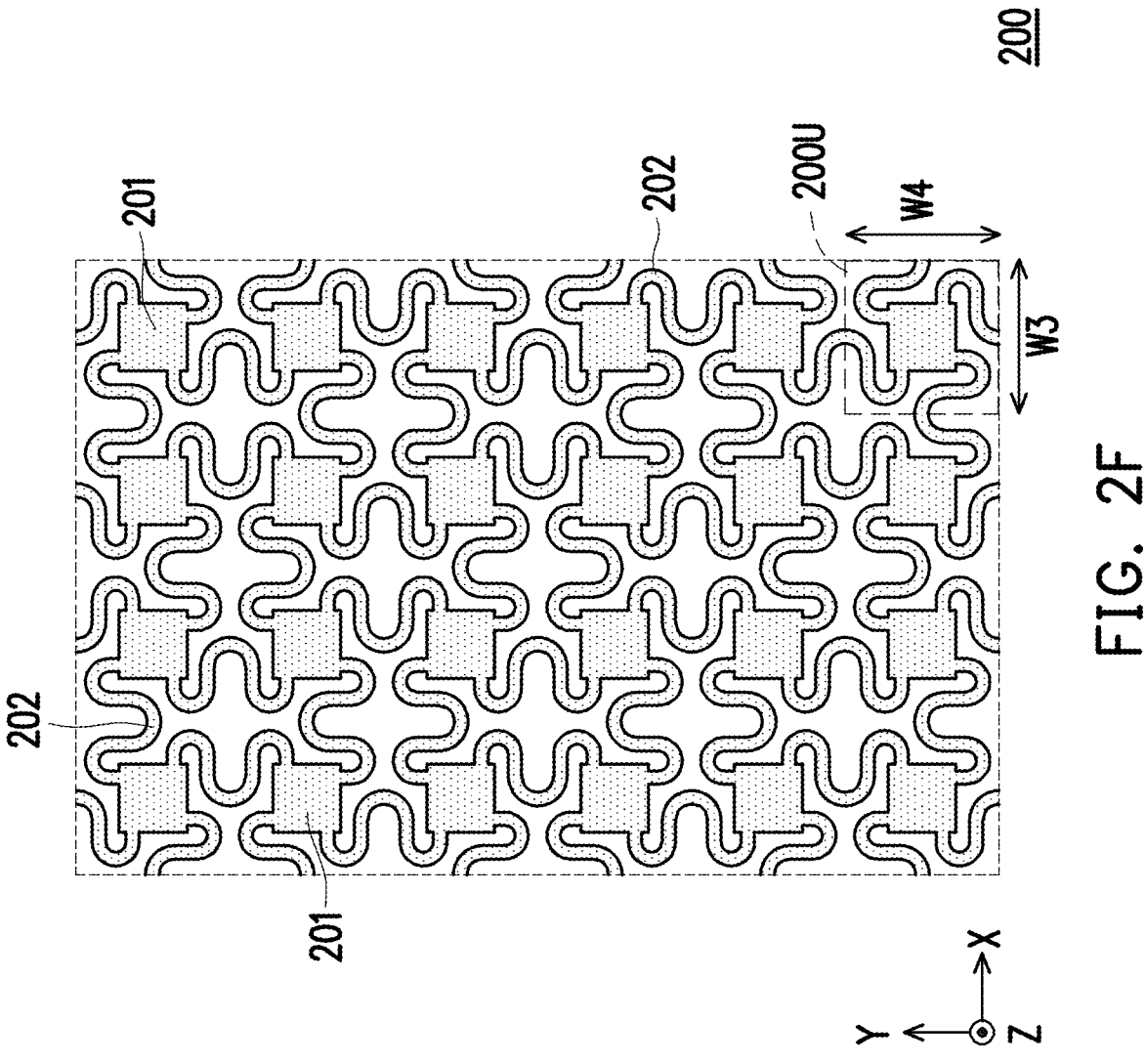
FIG. 2F is a planar schematic diagram of the stretchable display panel in FIG. 1A and FIG. 1B.

Referring to FIG. 2F, FIG. 2F is a planar schematic diagram of the stretchable display panel in FIG. 1A and FIG. 1B. The stretchable display panel 200 may be considered to be composed of multiple display units 200U arranged in an array, and each display unit 200U has the same structure. Each display unit 200U includes at least one island structure 201 and at least one bridge structure 202. Each display unit 200U has a first width W3 in the X direction and a second width W4 in the Y direction. It should be noted that, as shown in FIG. 2A and FIG. 2B, the stretchable touch panel 100 provided according to the embodiment of the disclosure does not have an island structure in contrast to touch panels known in the prior art. Therefore, the stretchable touch panel 100 of the disclosure does not need to be aligned with the stretchable display panel 200. In other words, the first width W3 of each display unit 200U may be equal to or not equal to the first width W1 of each touch micro-unit 101U, and the second width W4 of each display unit 200U may be equal to or not equal to the second width W2 of each touch micro-unit 101U. Accordingly, the manufacturing process of the stretchable display device 1 is simplified, and the moire fringes generated in the prior art due to the bonding of the touch panel and the display panel may be avoided.

To sum up, in the stretchable display device provided according to an embodiment of the disclosure, the ratio of the Young's modulus of the stretchable touch panel to the Young's modulus of the stretchable display panel is within the range of 0.5 to 1.5, which may prevent structural damage inside the stretchable touch panel and the stretchable display panel, resulting in high tensile strength of the stretchable display device. Furthermore, according to the stretchable display device provided by embodiments of the disclosure, the alignment process between the stretchable touch panel and the stretchable display panel may be omitted, and the generation of moire fringes may also be prevented.

What is claimed is:

1. A stretchable display device, comprising:
    a stretchable display panel, having a first Young's modulus; and
    a stretchable touch panel, disposed on the stretchable display panel and having a second Young's modulus, wherein a ratio of the second Young's modulus to the first Young's modulus is within a range of 0.5 to 1.5, wherein the stretchable touch panel comprises a plurality of touch micro-units arranged in an array, each of the touch micro-units comprises:
        a patterned support layer;
        a plurality of first conductive lines, disposed on the patterned support layer;
        a plurality of second conductive lines, disposed on the first conductive lines; and
        an insulating layer, disposed between the first conductive lines and the second conductive lines, wherein each of the first conductive lines has a plurality of first bending points, and each of the second conductive lines has a plurality of second bending points, wherein the patterned support layer comprises a first portion overlapping with the first conductive lines and the second conductive lines, a second portion corresponding to the first bending points, and a third portion corresponding to the second bending points, the second portion has a plurality of first upper surfaces, the third portion has a plurality of second upper surfaces, and a total area of the first upper surfaces is not equal to a total area of the second upper surfaces, wherein each of the touch micro-units has a first width (W1) in a first direction and a second width (W2) in a second direction, the second width (W2) is greater than the first width (W1), the first conductive lines are symmetrically disposed with respect to a first virtual axis, the second conductive lines are symmetrically disposed with respect to a second virtual axis, the first virtual axis is parallel to the first direction, the second virtual axis is parallel to the second direction, and a ratio of the total area of the first upper surfaces to the total area of the second upper surfaces is within a range of 1 to $2*(W2/W1)^{1/2}$.

2. The stretchable display device according to claim 1, wherein the stretchable display panel comprises a plurality of display units arranged in an array, the stretchable touch panel comprises a plurality of touch micro-units arranged in an array, each of the display units has a first width in a first direction and a second width in a second direction, each of the touch micro-units has a third width in the first direction and a fourth width in the second direction, and the third width is not equal to the fourth width.

3. The stretchable display device according to claim 2, wherein the first width is not equal to the third width.

4. The stretchable display device according to claim 3, wherein the second width is not equal to the fourth width.

5. The stretchable display device according to claim 1, wherein the first conductive lines are symmetrically disposed with respect to a first virtual axis, the second conductive lines are symmetrically disposed with respect to a second virtual axis, the first virtual axis is not parallel to the second virtual axis.

6. The stretchable display device according to claim 5, wherein the first virtual axis is perpendicular to the second virtual axis.

7. The stretchable display device according to claim 1, wherein a length of each of the first conductive lines is different from a length of each of the second conductive lines.

8. The stretchable display device according to claim 5, wherein each of the touch micro-units has a first width in a first direction parallel to the first virtual axis, and a second width in a second direction parallel to the second virtual axis, a ratio of a length of each of the first conductive lines to the first width is within a range of 1.5 to 3.0, and a ratio of a length of each of the second conductive lines to the second width is within a range of 1.5 to 3.0.

9. The stretchable display device according to claim 1, wherein the first conductive lines and the second conductive lines are bending lines.

10. The stretchable display device according to claim 1, wherein the total area of the first upper surfaces is greater than the total area of the second upper surfaces.

11. The stretchable display device according to claim 1, wherein a number of the first bending points is not equal to a number of the second bending points.

12. A stretchable display device, comprising:

a stretchable display panel, having a first Young's modulus and comprising a plurality of display units arranged in an array, wherein each of the display units has a first width in a first direction and a second width in a second direction; and a stretchable touch panel, disposed on the stretchable display panel and having a second Young's modulus, wherein a ratio of the second Young's modulus to the first Young's modulus is within a range of 0.5 to 1.5, wherein the stretchable touch panel comprises a plurality of touch micro-units arranged in an array, each of the touch micro-units has a third width in the first direction and a fourth width in the second direction, and comprises a patterned support layer;

a plurality of first conductive lines, disposed on the patterned support layer;

a plurality of second conductive lines, disposed on the first conductive lines; and an insulating layer, disposed between the first conductive lines and the second conductive lines, wherein the third width is not equal to the fourth width, wherein each of the first conductive lines has a plurality of first bending points, and each of the second conductive lines has a plurality of second bending points, wherein the patterned support layer comprises a first portion overlapping with the first conductive lines and the second conductive lines, a second portion corresponding to the first bending points, and a third portion corresponding to the second bending points, the second portion has a plurality of first upper surfaces, the third portion has a plurality of second upper surfaces, and a total area of the first upper surfaces is not equal to a total area of the second upper surfaces, wherein each of the touch micro-units has a first width (W1) in a first direction and a second width (W2) in a second direction, the second width (W2) is greater than the first width (W1), the first conductive lines are symmetrically disposed with respect to a first virtual axis, the second conductive lines are symmetrically disposed with respect to a second virtual axis, the first virtual axis is parallel to the first direction, the second virtual axis is parallel to the second direction, and a ratio of the total area of the first upper surfaces to the total area of the second upper surfaces is within a range of 1 to $2*(W2/W1)^{1/2}$.

* * * * *